US010659679B1

(12) United States Patent
Beeler et al.

(10) Patent No.: US 10,659,679 B1
(45) Date of Patent: May 19, 2020

(54) FACIAL LOCATION DETERMINATION

(71) Applicant: Disney Enterprises, Inc., Burbank, CA (US)

(72) Inventors: Thabo Beeler, Zürich (CH); Derek Bradley, Zürich (CH); Giorgio Corbellini, Zürich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 153 days.

(21) Appl. No.: 15/678,963

(22) Filed: Aug. 16, 2017

(51) Int. Cl.
| | | |
|---|---|---|
| *H04N 7/18* | (2006.01) |
| *H04N 5/232* | (2006.01) |
| *G06K 7/10* | (2006.01) |
| *G01S 1/68* | (2006.01) |

(52) U.S. Cl.
CPC ..... *H04N 5/23219* (2013.01); *H04N 5/23296* (2013.01); *G01S 1/68* (2013.01); *G06K 7/10366* (2013.01)

(58) Field of Classification Search
CPC .............................. A61B 5/486; A61B 5/0205
See application file for complete search history.

(56) References Cited

U.S. PATENT DOCUMENTS

2016/0287166 A1* 10/2016 Tran ..................... H04B 1/3827

* cited by examiner

*Primary Examiner* — Anand S Rao
(74) *Attorney, Agent, or Firm* — Kilpatrick Townsend & Stockton LLP

(57) ABSTRACT

A method of determining facial location and orientation may include receiving a location of a first radio frequency (RF) tag on a subject; receiving a location of a second RF tag on the subject; determining a location and orientation of a face of the subject using at least the location of the first RF tag and the location of the second RF tag; and sending commands to one or more camera units. The commands may cause the one or more camera units to capture the location and orientation of the face of the subject.

20 Claims, 16 Drawing Sheets

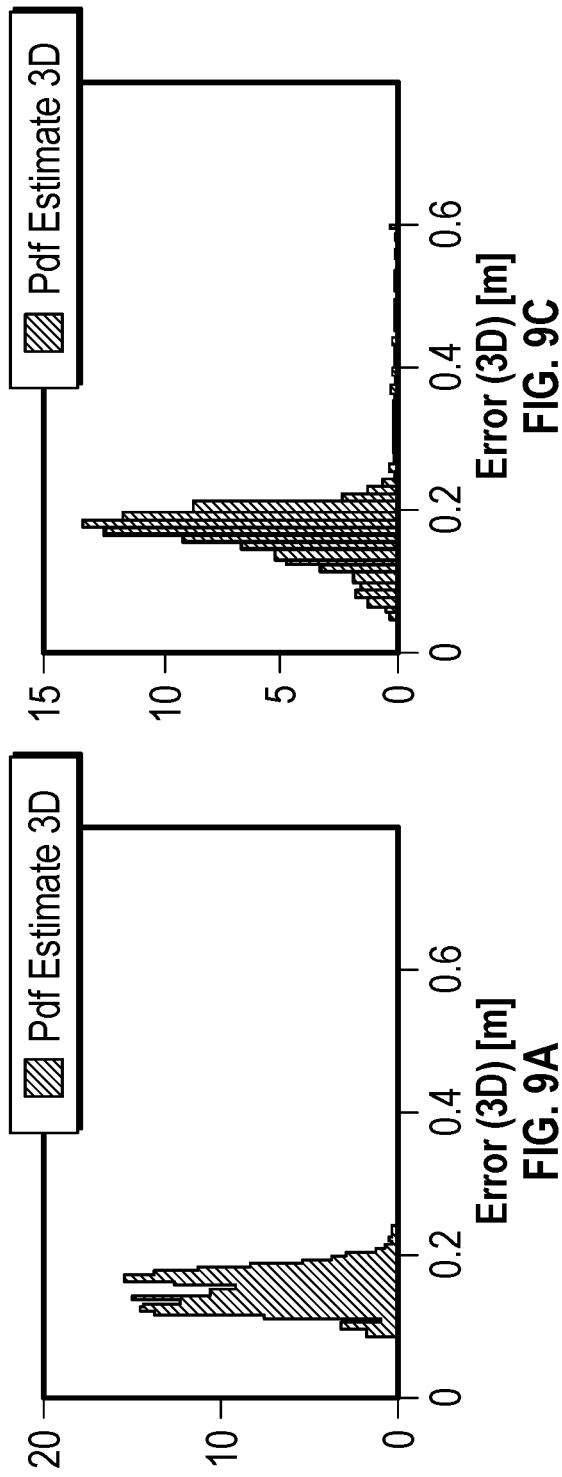
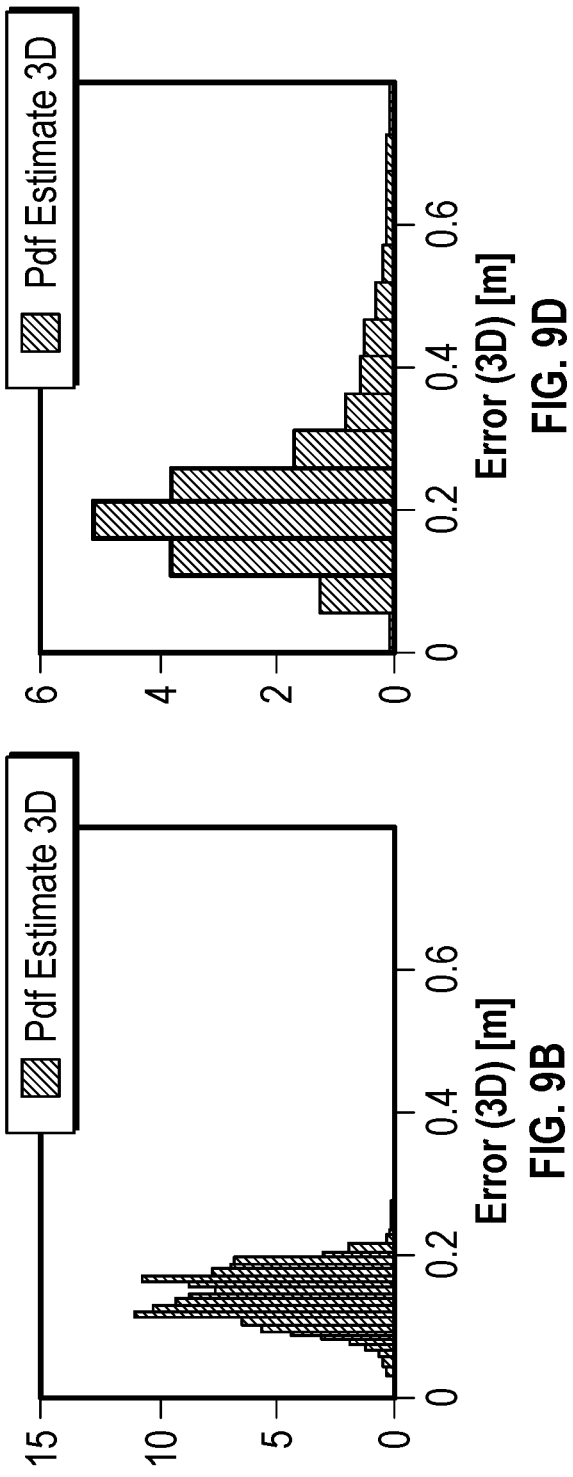
FIG. 9A
FIG. 9B
FIG. 9C
FIG. 9D

FACIAL LOCATION DETERMINATION

BACKGROUND

Indoor localization, including the localization of humans in an indoor setting, has been the focus of numerous research projects, and there exists commercial off-the-shelf solutions both for the industrial and consumer world. However, there are many scenarios that are not handled well by those solutions. For example, performance capture has become the industry standard method for driving virtual character animation in films, video games, and even live-action shows. In particular, facial capture is especially important because the face is arguably the most important part of a character, yet it is the most difficult component to animate correctly. In order to perform facial capture, high-quality video determination of the subject's face is a critical component.

BRIEF SUMMARY

In some embodiments, a method of determining facial location and orientation may include receiving a location of a first radio frequency (RF) tag on a subject and receiving a location of a second RF tag on the subject. The method may also include determining a location and orientation of a face of the subject using at least the location of the first RF tag and the location of the second RF tag. The method may additionally include sending commands to one or more camera units. The commands may cause the one or more camera units to capture the location and orientation of the face of the subject.

In some embodiments, a system may include a first radio frequency (RF) tag on a subject, a second RF tag on the subject, one or more camera units, one or more processors, one or more memory devices comprising instructions that, when executed by the one or more processors, cause the one or more processors to perform operations including receiving a location of the first RF tag on the subject. The operations may also include receiving a location of the second RF tag on the subject. The operations may additionally include determining a location and orientation of a face of the subject using at least the location of the first RF tag and the location of the second RF tag. The operations may further include sending commands to the one or more camera units. The commands may cause the one or more camera units to capture the location and orientation of the face of the subject.

In some embodiments, a non-transitory, computer-readable medium may include instructions that, when executed by one or more processors, cause the one or more processors to perform operations including receiving a location of the first RF tag on the subject. The operations may also include receiving a location of the second RF tag on the subject. The operations may additionally include determining a location and orientation of a face of the subject using at least the location of the first RF tag and the location of the second RF tag. The operations may further include sending commands to the one or more camera units. The commands may cause the one or more camera units to capture the location and orientation of the face of the subject.

In any embodiments, any of the following features may be included in any combination and without limitation. The first RF tag and the second RF tag may include Ultra-Wideband (UWB) tags. The first RF tag may be attached to a first shoulder of the subject, and the second RF tag may be attached to a second shoulder of the subject. The first RF tag may be attached to a first side of a head of the subject, and the second RF tag may be attached to a second side of the head of the subject. The subject may be on a film set, and the one or more cameras may be capturing a scene of a film. The subject may be in an immersive environment. The immersive environment may include a virtual reality environment. The immersive environment may include an augmented reality environment. The one or more camera units may include a camera and a pan-tilt mount. The commands may cause the one or more camera units to capture the location and orientation of the face of the subject by changing a pan, a tilt, and a zoom of the one or more camera units. The system may further include one or more RF anchors that are distributed around the subject, where the one or more RF anchors may provide time-of-arrival (ToA) measurement to determine the location of the first RF tag and the second RF tag. The method/operations may also include determining a camera unit in the one or more camera units that best captures the face of the subject for each frame. The method/operations may additionally include generating a video sequence where each frame is selected from the camera unit in the one or more camera units that best captures the face of the subject for each frame. Determining the location and the orientation of the face of the subject using at least the location of the first RF tag and the location of the second RF tag may include removing noise from a time series of RF tag measurements by averaging the time series over time; filtering a series of measurements of the location of the first RF tag to remove position outliers; compensating for obstacles by computing a ratio between a total path strength and a first path strength for each of a plurality of RF measurements; solving a mulilateration formulation using a least-squares approach; and computing a pose of the face of the subject in terms of yaw, pitch, and roll.

BRIEF DESCRIPTION OF THE DRAWINGS

FIGS. 9A-9D illustrate probability density function estimates of the error for both RTLS and TWR scenarios with and without obstacles.

DETAILED DESCRIPTION

This application discloses systems and methods for determining a location of an subject's face. This can be distinguished from determining a location of individual points or features on the subject's face. Instead, these methods and systems focus on determining the location of the face as a whole as the subject moves around a set or immersive environment, such as a virtual or augmented reality environment. The term "facial determination" may be used interchangeably herein with the terms "facial location determination," and "location determination." Each of these terms refers to determining the location/orientation of a subject's face as the subject moves around and environment.

Performance capture has become the industry standard method for driving virtual character animation in films, video games, and even live-action shows. In particular, facial capture is especially important because the face is arguably the most important part of a character, yet it is the most difficult component to animate correctly. In order to perform facial capture, high-quality video determination of the subject's face is a critical component.

Prior to this disclosure there were two general approaches to video-based facial capture. In the first approach, the subject is constrained to a fixed chair with a fixed headrest in a capture studio, surrounded by stationary cameras. This scenario is suitable for capturing high-quality facial geometry, but does not allow the subject to move freely or interact with other subjects in real environments. The second approach is to attach cameras to the subject, typically using helmet-mounted cameras (HMCs), which allows the subject to roam freely around a set. While increasing subject freedom over the first approach, the HMCs can be uncomfortable for the subject, and may be quite obtrusive as they extend tens of centimeters in front of the subject, blocking principle and other camera views of the face, and preventing subjects from close interaction with other subjects (such as kissing).

In order to allow fully unobtrusive and completely unconstrained facial performance capture in real environments, the embodiments described herein place cameras at a distance away from the subjects, and manipulate the cameras such that they are always focused and zoomed onto the subjects' faces as they move around 100% freely. This is a fully automatic approach for real-time unconstrained, unobtrusive facial determination in real environments. This approach allows an arbitrary number of cameras to be placed at various locations on a set, and automatically determine location/orientation of subjects' faces through turreted pan and tilt motion guided by an unobtrusive network of radio devices that precisely (1) localize the subjects in the scene and (2) determine where they are looking.

Figure 1:
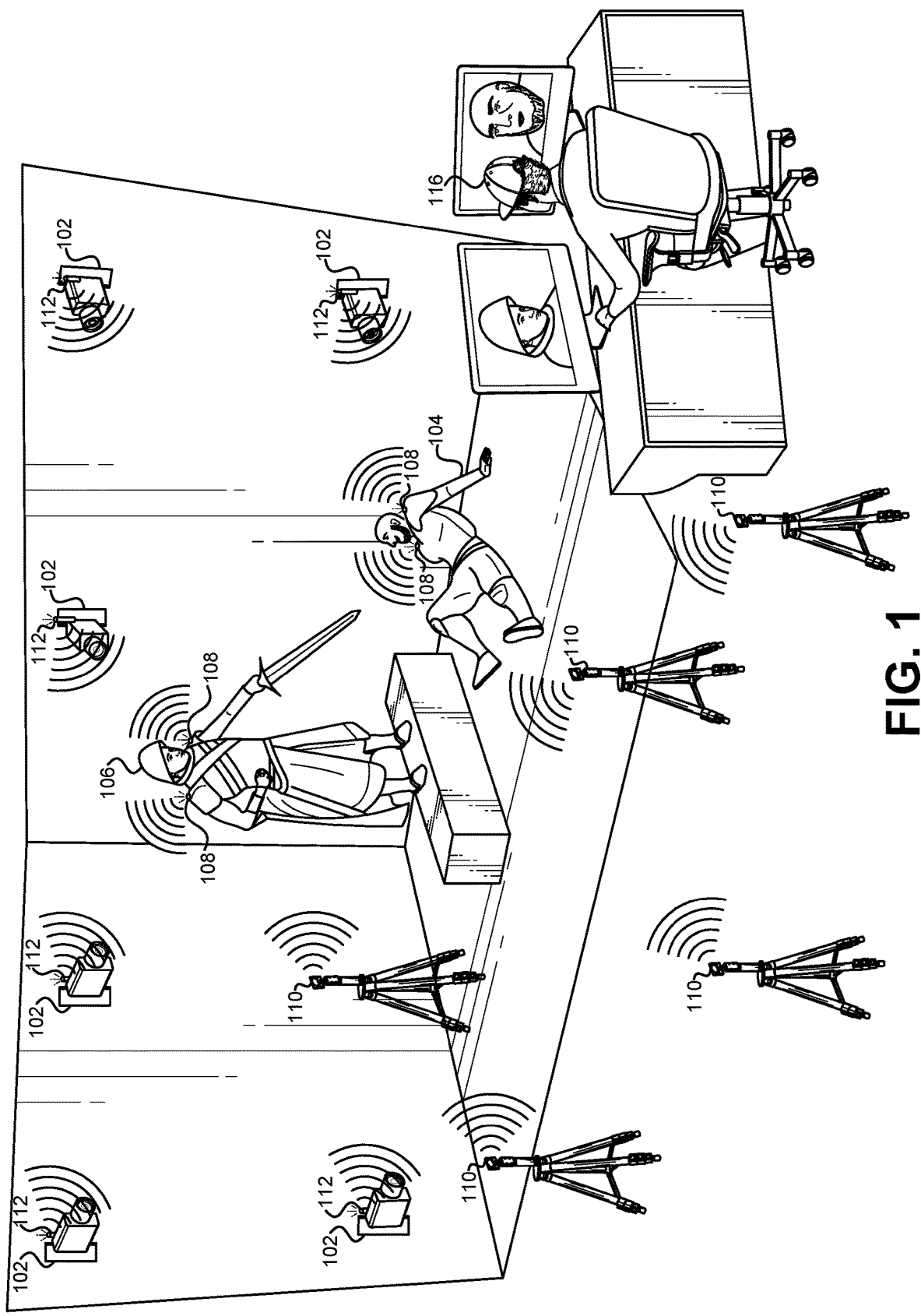
FIG. 1 illustrates an example of a movie set where a scene is filmed, which may include several subjects that play a role in a scene, according to some embodiments.

FIG. 1 illustrates an example of a movie set where a scene is filmed, which may include several subjects 104, 106 that play a role in a scene, according to some embodiments. If the position and orientation of each subject 104, 106 can be determined, then this information can be used to automatically control a group of cameras 102 so that these cameras 102 are focused on the subjects' faces. Automatic cameras 102 may be used, and may offer interesting artistic opportunities and may also offer economic benefits. The determination/localization system described herein is highly mobile, self-calibrating so that filming can start as soon as a set is constructed, adaptable to low-light environments, and is unobtrusive. Specifically, the system is capable of self-calibrating and autonomous operation after deployment. The system also guarantees a high level of accuracy—on the order of tens of centimeters—and works will independent of environmental conditions. The system is also scalable to cover a plurality of humans.

Some embodiments are based on impulse radio such as Ultra-wideband (UWB), and they offer a compromise between accuracy, unobtrusiveness, ease of calibration, and maintenance. The UWB radio tags 108 can be placed on the subjects 104, 106 to follow both their location and their facial direction. Many commercially available components may be used (e.g., 3 dB Technologies, Ciholas DWUSB) that allow for the construction of practical systems without designing specialized hardware. Some embodiments may use off-the-shelf anchors positioned in the room and tags 108 carried by the subjects to follow their location. Some embodiments may use at least two tags per subject, for example, positioned on the subject's back, to enable position and orientation estimation. However, the system design is general and the number of tags per subject can be more or less than two. Because multilateration techniques allow the system to turn "time-of-arrival" measurements into localization information, the system is designed to be scalable up to more than 10 subjects. Its accuracy is invariant of the number of subjects that are determined, and robust with respect to the number of anchors used.

The system of FIG. 1 is an automatic facial location/orientation determination system that uses an unobtrusive network of radio devices to locate the subjects 104, 106 and localize their faces from the point of view of arbitrary cameras 102 placed on controllable pan-tilt turrets in the scene. For simplicity, this embodiment is described below with respect to one subject 104, but the same technique can be applied to many subjects at once.

The system includes one or more cameras 102 on controllable pan-tilt turrets placed around the scene. Some embodiments may place cameras 102 around the boundary of a set or immersive environment, but this is not required. Each of the one or more cameras 102 may be referred to herein as a "camera unit." Each camera unit may be comprised of the camera, the control panel-tilt turret/mount, an RF antenna/anchor, a wall mount, a control unit, and so forth.

The immersive environment may include a virtual reality environment, and thus the system may include one or more virtual reality headsets worn by one or more of the subjects. The immersive environment may also include an augmented reality environment, and thus the system may include one or more augmented reality headsets worn by one or more of the subjects.

The system also may include an array of N stationary radio devices (anchors) 110, and a minimum of two mobile radio device tags 108 per each subject. The tags 108 are minimally intrusive as they are small (e.g. the size of a pin) and can be worn underneath the clothing. Some embodiments may place one tag on each shoulder of the subject. The locations of radio anchors 110 and cameras 102 can be arbitrary and they do not have to be at the same locations.

In the embodiment of FIG. 1, the cameras 102 and the radio anchors 110 are co-located on the same mounting fixture. This eases the process of installation and minimizes the amount of hardware dispersed around the environment. Together, the network of N anchors 110 is used to localize the subject's face and to control the turreted cameras, as described below.

In some embodiments, both the anchors 110 and the tags 108 may use ultrawide band (UWB) radio technology. The UWB technology offers some advantages over other options, such as regular radio frequency, acoustic techniques, and optical techniques because UWB uses very short radio pulses that correspond to a very large bandwidth in the frequency domain to obtain the ranging between two devices with sub-centimeter precision. Precise ranging using UWB technology can be achieved in several ways such as "angle of arrival" (AoA) and/or "time of arrival" (ToA). In some embodiments, the ToA technique may be used because it is generally easier to implement in software. However, it will be understood that the same results may be be achieved by using different ranging techniques that simply require different hardware.

For purposes of this disclosure, a radio signal is a UWB signal either if it uses a signal bandwidth higher than 500 MHz or if its fractional bandwidth is larger than 20%. Such large bandwidths offer very high temporal resolution that is used for accurate ranging. The oldest UWB radios were used as radar with single transceiver devices. However, because of its low-power consumption, UWB has become part of the Standard for Wireless Personal Area Networks (WPANs) 802.5.4 for both ranging and communication applications (IEEE. 802.15.4-2011, "Part 14: UWB PHY". September 2011). The standard defines the UWB physical layer, the frequencies of the 16 available UWB channels, and the frame formats.

There are several ranging techniques that use UWB radios. This disclosure focuses on time-based approaches because they do not require cumbersome initial setup of anchor positions, thus increasing portability of the system. Two time-based approaches are considered, namely "time-of-arrival" (ToA) and "time-difference-of-arrival" (TDoA). The ToA approach is based on measuring the time that a radio frame needs to travel from the transmitter to the receiver, given the known speed of radio signal propagation. ToA requires precise synchronization between transmitter and receiver, as the relative clock drifts and the clock accuracy affect its accuracy. In one implementation of a ToA technique, the transmitter marks every frame with an absolute timestamp that the receiver uses to estimate the distance. "Two-way-ranging" (TWR) is a cooperative version of ToA that does not require synchronization between transmitter and receiver because the transmitter sends a frame and counts the time until the receiver responds with a confirmation frame.

To use the TDoA approach, there a network of static anchors may be synchronized among each other. If the position of the anchors is known, each anchor listens to the mobile subject frames and measures its local ToA. Then, the anchors exchange their local ToA values to measure the time difference among them. Since their clocks are synchronized, they can estimate the position of the mobile subject.

In some embodiments, the system can estimate the position of the two tags 108 on the shoulder of the subject 104, estimate the location and direction of the face from the two tags, aim one or more cameras at the face of the subject 104 through pan/tilt and zoom, then using the facial video for performance capture. All of these steps are fully automatic. This process is described in detail below, by first executing a set up an calibration process, a location determination process, and a video postprocessing process.

In order to provide an enabling disclosure, the hardware for one specific embodiment is described below. It will be understood that this hardware is only used in one example embodiment, and many other hardware/software solutions may be possible in light of this disclosure. Therefore, the hardware used below is listed merely by example, and is not meant to be limiting.

Some embodiments may use the following example hardware.
  Eight Ciholas® DWUWB tags used as static anchors
  Eight Manfrotto® stands to support the anchor nodes
  One Intel® NUC PC that runs the location determination software
  Two Ciholas® DWUWB tags used as tags on the shoulders
  Two video cameras: one Canon® EOS 500D and one Canon® PowerShot SX240 HS
  Two PowerPod pan-tilt head mechanisms connected to the system Some embodiments may also use the following example software.
  One ROS® robotic operating system
  Native TWR code from Ciholas®

Figure 2B:
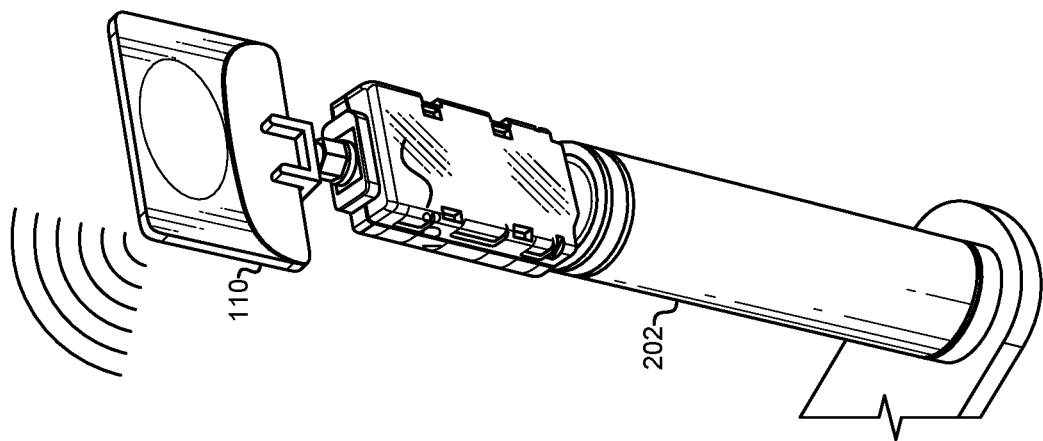
FIG. 2B illustrates an example of a UWB tag or anchor connected to a battery pack, according to some embodiments.
Figure 2A:
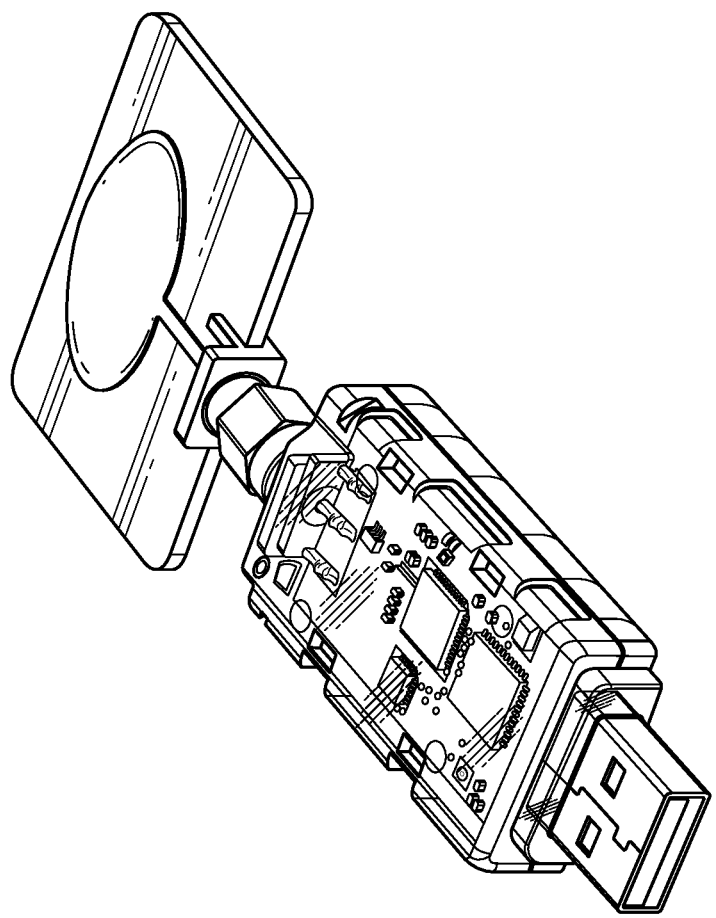
FIG. 2A illustrates an example of a UWB radio device that can be used as a tag or an anchor, according to some embodiments.
Figure 3:
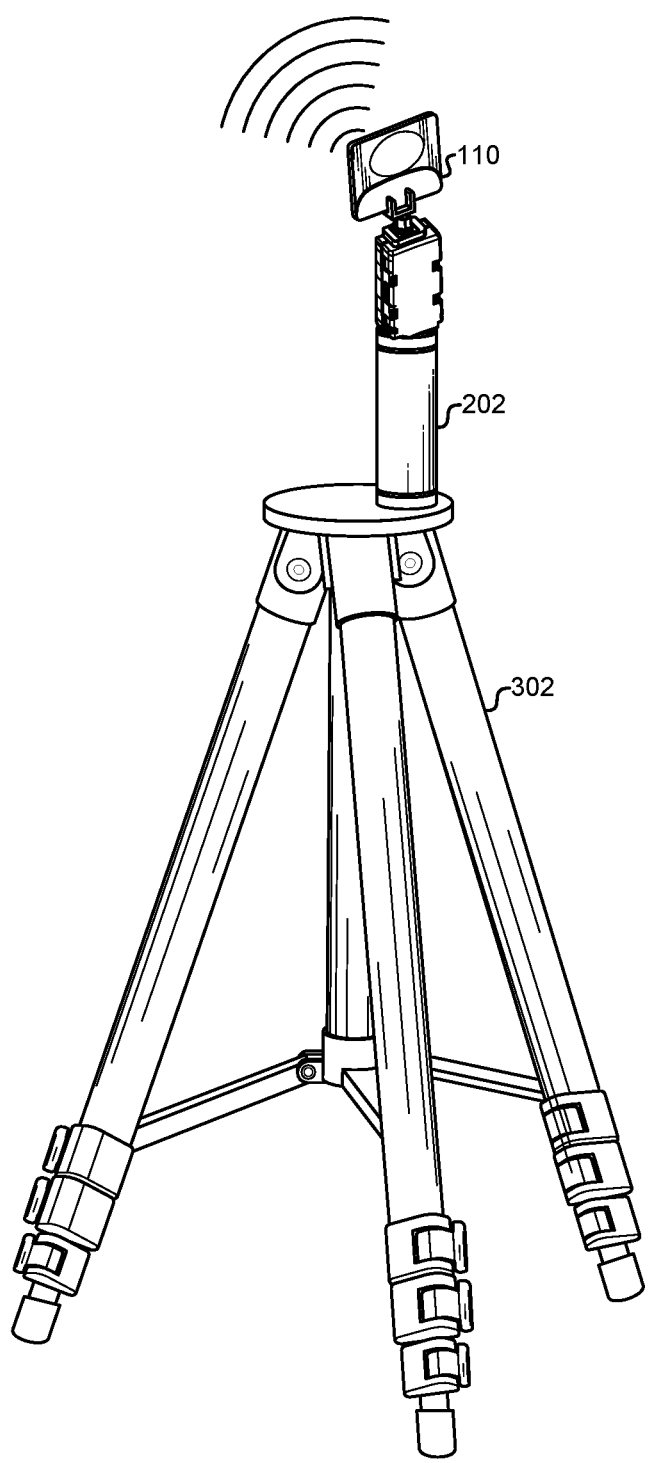
FIG. 3 illustrates an example of a UWB anchor mounted on a stand with a battery pack for use in a scene or immersive environment.

To obtain ranging with two or more UWB devices and a ToA techniques, the radio chips in each device 108, 110 may be synchronized. FIG. 2A illustrates an example of a UWB radio device that can be used as a tag 108 or an anchor 110, according to some embodiments. This specific embodiment is a DWUSB available from Ciholas®. This this particular device was chosen because they may include an ARM processor, RF transceiver, accelerometer, gyroscope, magnetometer, altimeter, and USB interface. More importantly, They can be configured to share the same time clock and enable ToA ranging between any pair of devices. As described below, the actual distance between any pair of devices may be estimated using a "two-way ranging" (TWR) technique. Given the ranging of all the pairs of devices, the position of the tags can be estimated using standard multilateration techniques. Note that other techniques may be chosen to provide similar precise indoor localization. FIG. 2B illustrates an example of a UWB tag 108 or anchor 110 connected to a battery pack 202 so that the anchor 110 can be active the entire time a scene is being filmed or an immersive environment is being used. FIG. 3 illustrates an example of a UWB anchor 110 mounted on a stand 302 with a battery pack 202 in a scene or immersive environment.

Before facial location determination begins, the system may undergo an initialization and calibration process. In some embodiments, the initialization may include setting up cameras 102 and antennas 112 in will be referred to as the "capture volume," which may include the location in which the subjects are to be captured by the cameras 102. The position of both antennas 112 and cameras 102 can be arbitrary so long as the positions are known to the system. In some embodiments, the N anchors can estimate their relative position automatically with an error of about 30 cm. Similarly, the position of the cameras 102 may be known to the system because the cameras are decoupled from the antennas 112. In some embodiments, the cameras 102 can also be attached to an antenna 112 as illustrated in FIG. 1 so that their position can also be estimated automatically. Some embodiments may also allow for the cameras 102 to be manually calibrated, while other embodiments may use self-calibrating cameras.

Figure 4:
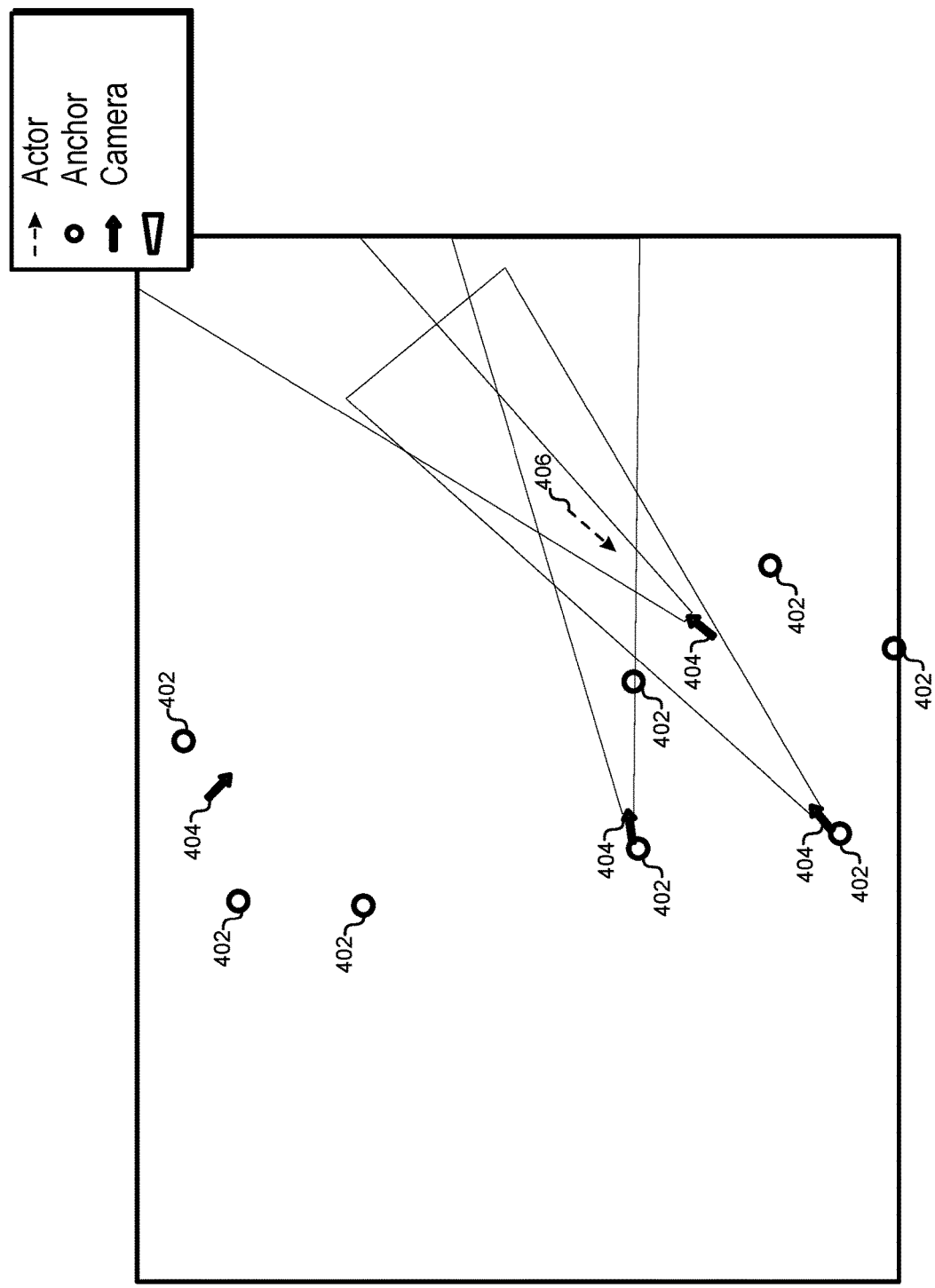
FIG. 4 illustrates a view on the user workstation of the capture volume while the facial location system is running, according to some embodiments.
Figure 5:
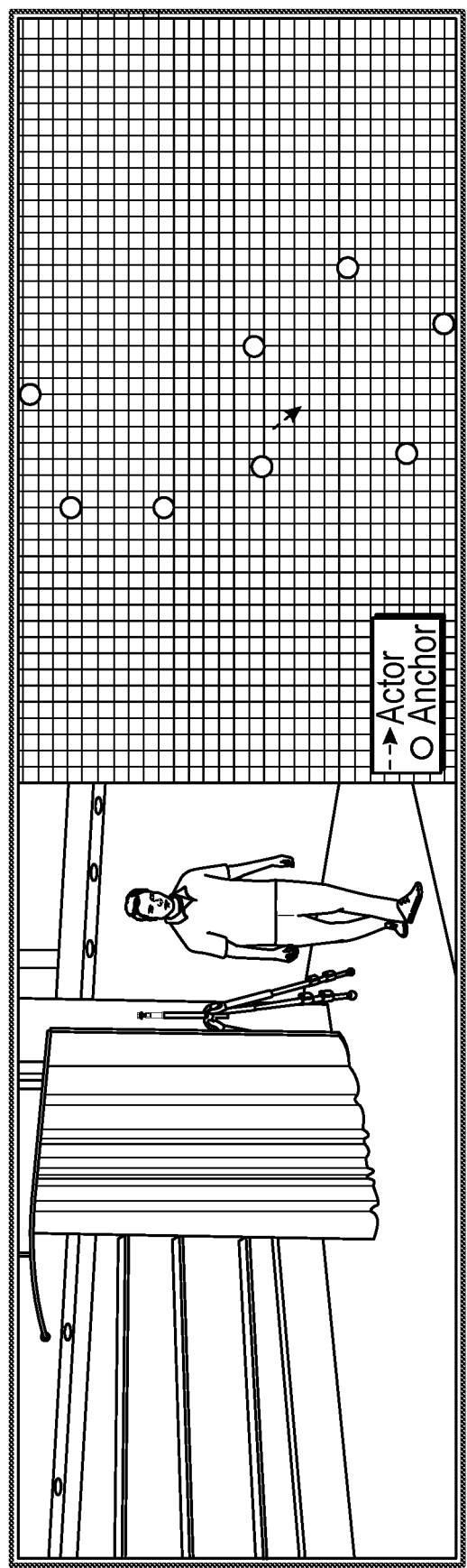
FIG. 5 illustrates a view from the user interface for determining activity of one subject, according to some embodiments.

Once the position of both cameras and antennas is known, the system is ready to be used. The user 116 may enter how many subjects need to be located and the ID of the antennas that are on their shoulders. FIG. 4 illustrates a view on the user workstation of the capture volume while the facial location system is running, according to some embodiments. When the facial location system begins processing capture volume, the display may show eight anchor icons (circles) 402, four simulated cameras (large arrows, three with field-of-view cones) 404, and one subject (small arrow) 406. In FIG. 4, which corresponds to a snapshot from a real location/orientation determination situation, two of the cameras 404 are placed in the same location of two anchors 402. Given the current position and heading of the subject, only three of the cameras are capturing at the current time. FIG. 5 illustrates a view from the user interface activity of one subject 502. The subject 502 (on the left) is moving freely in the capture area with two tags on his shoulders (not shown for clarity).

Figure 6:
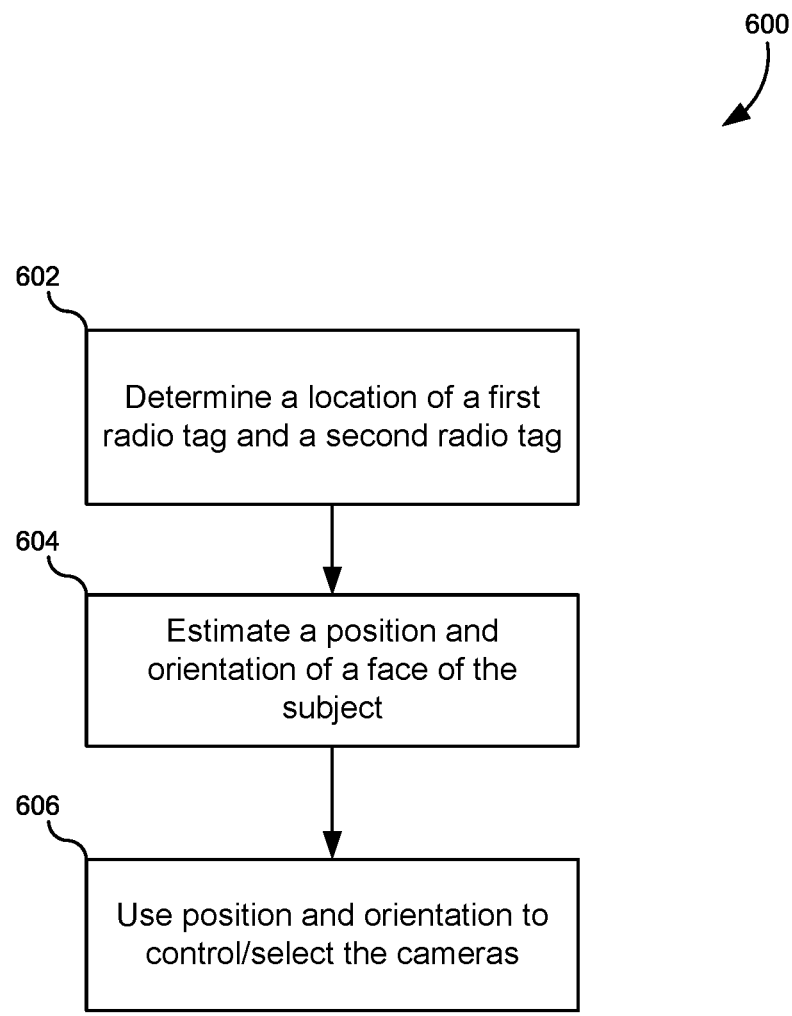
FIG. 6 illustrates a flowchart of a method for determining a facial location and/or orientation, according to some embodiments.

FIG. 6 illustrates a flowchart 600 of a method for determining a facial location and/or orientation, according to some embodiments. The method may include determining a location of a first radio tag and a radio second tag (602). The first radio tag and the second radio tag may be affixed to opposite shoulder areas of a subject. The method may also include estimating a position and/or orientation of the face of the subject (604). In some embodiments, a network of anchors may estimate the position of each tag separately using ToA and/or TWR. Some embodiments may also remove outliers by determining when the absolute value of the same tag is higher than a given threshold such that the current ranging can be discarded. Some embodiments may also apply a shoulder-distant constraint to the estimated position of the tags to discard other outliers. The first tag may be associated with a left shoulder and the second tag may be associated with a right shoulder, and vice versa. Because the system knows which tag is applied to each shoulder, the orientation of the subject's head can be estimated. Some embodiments may also apply a Kalman filter to smooth the estimated position and/or orientation of the face of the subject. This location/orientation determination procedure is described in greater detail below. In some embodiments, the system may aim at determining a middle point between the two tags—or slightly above—to represent the middle of the subject's face.

The method may also include using the position and/or orientation of the subject to control one or more cameras, such that the camera is focused on the face of the subject (606). In some embodiments, both the position and orientation of the subject are used to drive the motion of the pan-tilt turrets that operate the cameras as shown in FIG. 1. Although the display in FIG. 4 shows four cameras, other implementations may use more or less than this number.

The video streams provided by the cameras determining the location/orientation of the face of the subject can be directly used for single or multi-view facial performance capture. These two parts of the embodiments described herein may go hand-in-hand for a complete unobtrusive facial performance capture solution, which can highly impact how facial capture is applied in film and video games in the future. Specifically, the orientation of the subject face can be used to not only drive the camera pan/tilt/focus of one or more cameras to ensure that a camera is focused on the subject's face, but it can also be used to select among different camera views. As illustrated in FIG. 4, three of the cameras 404 are active because they have a field of view that includes the subject's face based on the orientation of the subject's face. The fourth camera 404 (the top camera) is not active because it may have been determined that the field of view of this camera would not include the subject's face based on the estimated orientation of the subject's face. Therefore, each frame from each camera can be tagged with a score that indicates how directly the camera's field of view lines up with the subject's face. A central line of sight of the camera can be compared to the orientation vector of the subject's face, and an error, or difference between the two, can be calculated. When selecting among different cameras that are simultaneously capturing images of the subject, this difference can be used to select the camera with the best, most unobstructed view of the subject's face. The selection can be done in real time, such that as the subject turns to the left or to the right, the system can dynamically switch between different camera views in real time that provide the best view of the subject's face. In some embodiments, a video sequence can be generated where each frame is selected from the camera that provides the best capture of the face of the subject for each frame.

In the description above, the radio tags are placed on the subject's shoulder for convenience. However, this tag positioning may not accurately determine the location/orientation of the subject's face when the subject moves their head, but not their shoulders. Therefore, other embodiments may place the tags on the side of the subject's head such that the system can accurately follow the subject's face when their shoulders remain stationary. Other embodiments may add one or more additional tags to the subject's head such that an accurate 3-D orientation of the subjects had can be determined. For example, instead of simply calculating site-to-side rotations of the head, using three or more tags can determine head movements in every direction. The mathematics described below are designed to accommodate an arbitrary number of tags, anchors, cameras, and/or subjects. Therefore, using two tags on the shoulders of the subject is merely done by way of example, and is not meant to be limiting.

This disclosure will now described in detail the method by which a position and orientation of a subject's face is determined in real-time. In order to precisely locate a the position and orientation of a subject's face, and then use that position and orientation to drive a camera in real-time, the system uses a network of static anchors that provide distance measurements for each anchor with respect to each tag as described above. As stated earlier, an arbitrary number of cameras, tags, subjects, and/or anchors can be processed in real time. Stated generally, given a network of M anchors with known positions, the system can determine a position and orientation of T mobile subjects, each carrying Ntags, in real time.

The accuracy of the position of the M anchors influences the final accuracy of the subject position estimation. In the description that follows we initially assume that the position of the anchors is known, afterwards, we show the impact of imprecise anchor location knowledge. Measuring the position of the static anchors has a relevant practical impact on the usability of the positioning system. In fact, for a flexible system it is desirable to have an automatic estimation of anchor position.

Figure 7:
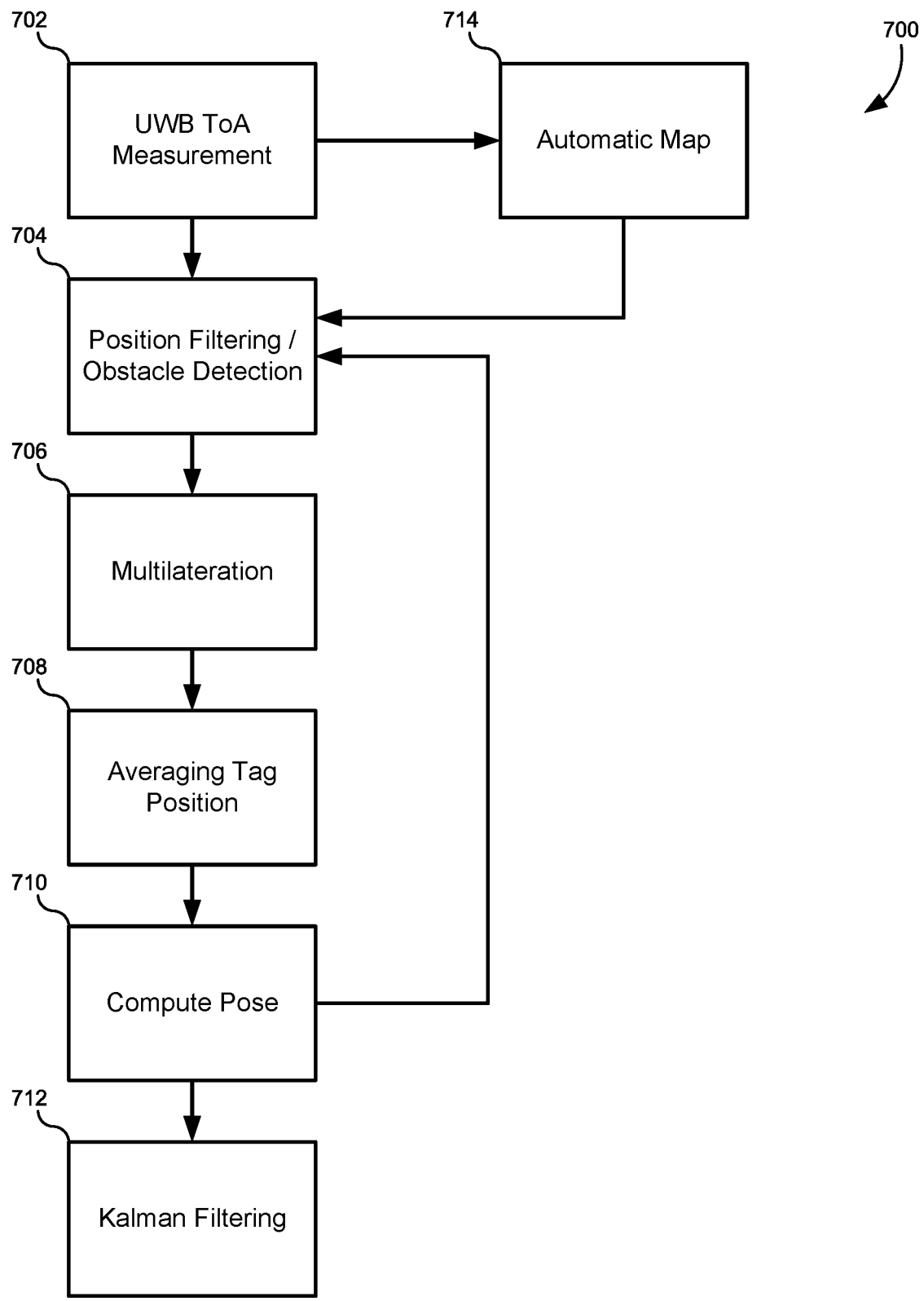
FIG. 7 illustrates flowchart of a position processing pipeline of the UWB facial location determination system, according to some embodiments.

FIG. 7 illustrates flowchart 700 of a position processing pipeline of the UWB facial location determination system, according to some embodiments. Each phase of the position processing pipeline is describing detail below. It will be understood that the actual equations and values used are merely provided by way of example, and not meant to be limiting. Other embodiments may optimize the values and/or equations use below to accommodate different operating environments.

Time-Averaging Filter—A position processing pipeline begins by receiving as inputs the distances from each pair {tag i, anchor j} (702). It can be assumed that the UWB distance measurements may be corrupted by a bias-free noise. To reduce the variance of the input values, the distance measurements between a given pair {tag i, anchor j} forming a time series of RF measurements may be averaged over time. The average of the last three measurements may be defined as: $avg(3)_{i,j}$=average($m_{i,j}[t-2]$, $m_{i,j}[t-1]$,$m_{i,j}[t]$) whereas the average of the second last and the previous values $avg(2)_{i,j}$, may be defined as average($m_{i,j}[t-2]$, $m_{i,j}[t-1]$,). The time-filtered measurement may then be defined as follows:

$$s_{I,J}[t] = \begin{cases} avg(2)_{i,j}, & |avg(2)_{i,j} - m_{i,j}[t]| > a \\ avg(3)_{i,j}, & \text{otherwise} \end{cases} \quad (1)$$

where a is threshold whose value depends on the maximum speed that a human can move. In fact, since the goal of the averaging filter is also to discard outliers, if the new measurement is larger than the empirical threshold a, then it is ignored. The output of the time averaging filter is a 1-D vector of length N×M defined as follows: $S[t]=\{s_{1,1}, s_{1,2}, \ldots, s_{1,M}, s_{2,1}, \ldots, s_{N,M}\}$ Position Filter—With the averaging filter it is possible to detect and ignore individual outliers, however, a series of consecutive false measurements might not be detected. Thus, a position filter (704) can be applied that weights the distance measurements based on a previously computed position of the subject p[t−1] in a closed loop, as shown in FIG. 7. Thus, the inputs of the position filter are S[t] and p[t—1]. Since the position of the anchors is known, the (N×M)-sized vector P that contains the distances between the position p[t−1] and the anchors can be calculated. Then, the difference D=|S[t]−P[t−1]| can also be computed. Let K may be defined as a binary vector whose element $k_{i,j}$ is 1 whenever the element $d_{i,j}$ is smaller than a threshold b, and 0 otherwise. The rationale behind the constant b is to define an accuracy threshold for filter the measurements. The binary vector K indicates whether a new measurement should be used to estimate the next position or not. (K may be used to build the weight matrix W that is fed to the multilateration algorithm described below.) If the sum of the elements of K is less than 4, it is may not be possible to determine a new 3D position given the new measurements. In this case, the 4 values used to compute the next positions are the 4 largest values of the (N×M)-sized vector C whose generic element is defined as follows: $c_{i,j}=e^{\alpha}$ with $$\alpha = -\frac{d_{i,j}^2}{(2\mu)^2}.$$

The value of μ may be chosen to be proportional to the accuracy constant b. The rationale behind C is that its elements are related to the confidence of each new measurement $s_{i,j}[t]$. The values of C may be normalized values and the closer a value is to 1, the higher the confidence of the new measurement.

Obstacle Detection—A setup with "No Line Of Sight" (NLOS) between tags and anchors indicates the presence of obstacles, and the distance measurements $s_{i,j}[t]$ may thus be strongly corrupted. To detect obstacles using UWB signals, the ratio between total path strength and the first path strength of the each measurement may be computed. In case of "Line of Sight" (LOS), the ratio may be very close to 1, more than a threshold amount. Nevertheless, if there is an obstacle, the total path strength is larger than the first path strength. The obstacle detection mechanism may compare the strength ratio to an empirically found threshold η.

Multilateration—The inputs to the multilateration stage of the pipeline (706) may include the positions of the anchors, the vector S[t], and the vector K. The resultant outputs of the multilateration maybe the position of the tags. Since the noise of the distance measurements is approximately Gaussian, the multilateration problem may be formulated as a least squares. In case each subject carries more than one tag and the relative position among the tags is known, some additional constraints can be added to the least squares multilateration problem (e.g., distances between tags or known z-value of a tag). The resulting least squares problem can be formulated as follows:

$$\hat{Q}=\operatorname{argmin}_Q\{[r-f(Q)]^T W[r-f(Q)]\} \quad (2)$$

Where $Q=[x_1, y_1, z_1, \ldots x_N, y_N, z_N]^T$ is the vector of the positions of all the tags. The function $f(Q)$ may be defined as:

$$f(Q)=[f_{1,1}(Q), \ldots, f_{N,M}(Q), g_1(Q), \ldots, g_L(Q)] \quad (3)$$

With $f_{i,j}(q)$ being a function that maps distance between the pair {tag i, anchor j}, $g_i(Q)$ being a function that models L additional constraints for the multilateration problem, $r=[S[t], h_1, \ldots, h_L]$ being a vector that contains the latest distance measurements between the tags and the anchors and the requested value of the additional information, W being a diagonal weight matrix of size ((N×M)+L, (n×M)+L) whose elements are the binary element of the vector K (as defined above) plus as many "1's" as the number of additional tag constraints.

Considering the function $f_{i,j}(Q)$, which is non-linear, it can be observed that the least squares problem is also nonlinear. Nonlinear least squares solvers can be computationally expensive, and they sometimes converge to a local minimum instead of the required global minimum. Thus, some embodiments may linearize the problem and use a linear least squares solver.

Averaging Tag Positions—Averaging the estimated position of the tags (708) may be performed for at least two reasons, both related to smoothing the results. First, averaging smoothes the output rate that is used to feed the video pose-computing step described below. Second, it also smoothes the estimated path of the mobile subject. In some embodiments, there may be two averaging design choices: the first favors high output rate and results in unstable estimated path, while the second favors smoothness and results in high lag. In the choice may be acceptable, depending on the requirements of the particular embodiment. As example, the rest of this disclosure will use results that generate a high output rate with a less stable estimated path in order to provide real-time results.

Pose Computing—The final step of the facial location determination system is to estimate the position and the orientation of an arbitrary number of moving subjects (710). The orientation can be obtained in different ways, one of which uses inertial measuring units (IMUs). In some embodiments, the orientation may be estimated using primarily the UWB radio devices. To do so, every mobile subject carries two tags as described above. The orientation of the subject in a 3-D space can be described by the triple of angles yaw, roll, pitch. By placing two tags on the subject, which both lie on the same axis, the yaw angle may be computed using basic geometry and track motion techniques, such as bending.

Kalman Filtering—The resulting pose of the subject may still be unstable and corrupted by noise in these case, an extended Kalman filter (EKF) may be used to further smooth both position and orientation (712). The EKF may not be the optimal filter for this problem, depending on the particular situation, but it is a computationally tractable approximation of an optimal filter, so the trade-off can be made between tractability and accuracy. In addition to smoothness, the EKF introduces robustness to missing measurements. In fact, the state estimations of the filter can compensate lack of input for short intervals. Further, the EKF adds flexibility to the entire system in terms of data fusion. Other embodiments of the EKF can handle additional inputs, such as IMUs, to improve the accuracy of the overall system.

Automatic Map Building—A flexible location determination system that can be easily deployed in different spaces may be able to self-configure and self-calibrate. To reach the self-calibration scope, a heuristic can be used that computes a map (714) of the M anchors using distance measurements between them without knowing their positions. The problem of map building may be formulated as a (nonlinear) least squares problem and may use the same linearized solving algorithm as for the multilateration. The input is the vector that contains the distance measurements between all anchors is defined as: $\Gamma=[\gamma_{1,2}, \ldots, \gamma_{M-1,M}]^T$. The map-building problem can be formulated as follows:

$$\hat{A} = \operatorname{argmin}_A \{[\Gamma - f(A)]^T [\Gamma - f(A)]\} \quad (4)$$

where A is an (M×3)-length vector containing the anchor positions and $f(A)$ is a vector function containing all functions $f_{i,j}(A)$ that map the distance between anchors i and j.

In particular embodiment was constructed to validate the facial position and orientation location system described herein. The Cihelas DWUSB-SMA 1.0.1 UWB devices described above or use both for the static anchors and for the mobile tags. The devices used firmware version is 0.5.0.3, and were monitored with the DWUSB GUI, version 1.4.2.0. In this embodiment, the static anchors formed a star topology, and the master node reported the distance measurements, which were computed using the ToA-TWR technique described above to one computer running the server. The system itself was implemented in C++ in a ROS Jade Turtle environment. The server ran on an Intel NUC NUC5i7RYH with an Intel Core i7-5557U processor and 16 GB RAM, using Ubuntu 14.04 LTS.

The threshold a that is described above was defined as $\alpha = 25 \Delta$, where $\Delta$ is the time between the current and the last measurement received by the network of anchors. The value of the variable b was set to b=0.3, and μ was set to μ=0.2511. As described above, μ may be defined as being proportional to b, the reason being that the vector C is computed first, and then vector K is computed based on the vector C. The value for $k_i=0$ if $c_i<0.7$ and $k_i=1$ otherwise. To set all $k_i=0$ if $d_i>b$, the two variables p and b can be linked, and the relationship can be set to μ=0.8372·b. C is computed instead of computing K directly because C is used to compute the variance of each position, which is then fed to the Kalman filter.

This the data below assumes that each subject carried two tags on the shoulders in order to compute the position and the pose. Therefore, two constraints were added to the least squares multilateration problem: (1) the distance between tag 1 and tag 2 is constant and equal to 0.3 m and (2) the tags have same height. The additional constraints result in the following functions: $g_1(Q)$ (the function that computes the distance between the two tags) and $g_2(Q)$ (the function that computes the difference of the z-values of both tags with constraints $h_1=0.3$ and $h_2=0$). In case of high input frequency, the overall input rate was approximately N×M×10 Hz. The output rate of the Kalman filter used the ROS robot localization, and it was set to 30 Hz.

The experimental evaluation is based on two indoor scenarios (one small room and one large room) to follow both static and mobile subjects. In both scenarios a network of up to 15 anchors was deployed at different locations to evaluate the impact of anchor numbers, density, and distance from the environment's walls. The anchors were placed at different heights (e.g., 0 cm, 50 cm, 100 cm, 150 cm, etc.) from the ground. The small room had a size of approximately 4×4 m², and was equipped with a millimeter-accurate optical following system (the Optitrack® model S250e) that was used to estimate the exact 3D position of the subjects as "truth" reference. The large room had dimensions of approximately 13×8 m². Using this setup, the accuracy and stability of the system was evaluated over time. The results described below compare the TWR-based technique with respect to off-the-shelf real time location system (RTLS).

One purpose of this test setup was to determine how the two systems performed when obstacles were present. The RTLS system provided high positioning accuracy in both static and mobile scenarios when there were no obstacles within the convex hull created by the anchors. Table 1 lists the average estimated error [m]±std of a static scenario for both RTLS and the system based on TWR. Table 2 lists the average estimated error [m]±std of a single mobile subject scenario for both RTLS and the system based on TWR. However, the presence of an obstacle, such as a person standing or walking within the capture area during the measurements, the RTLS accuracy suffered and its accuracy dropped.

TABLE 1

|  | RTLS | TWR |
| --- | --- | --- |
| 2D no Obstacles | 0.08 ± 0.036 | 0.12 ± 0.031 |
| 2D with Obstacles | 0.16 ± 0.132 | 0.12 ± 0.039 |
| 3D no Obstacles | 0.17 ± 0.050 | 0.15 ± 0.026 |
| 3D with Obstacles | 0.27 ± 0.285 | 0.14 ± 0.036 |

TABLE 2

|  | RTLS | TWR |
| --- | --- | --- |
| 2D no Obstacles | 0.08 ± 0.036 | 0.12 ± 0.031 |
| 2D with Obstacles | 0.16 ± 0.132 | 0.12 ± 0.039 |
| 3D no Obstacles | 0.17 ± 0.050 | 0.15 ± 0.026 |
| 3D with Obstacles | 0.27 ± 0.285 | 0.14 ± 0.036 |

Figure 8A:
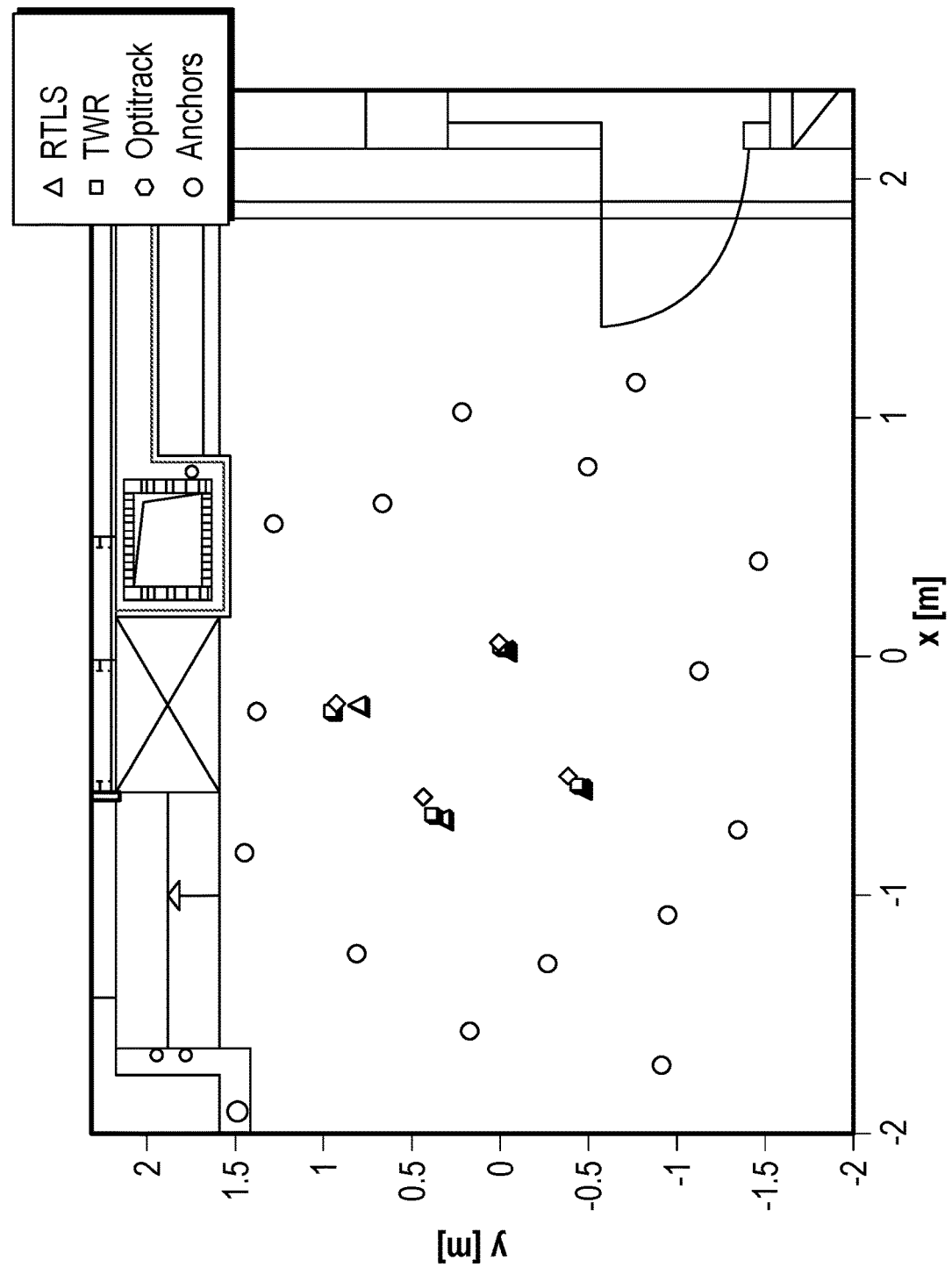
FIGS. 8A-8D illustrate the results for a static location determination scenario in the small room, according to some embodiments.
Figure 8B:
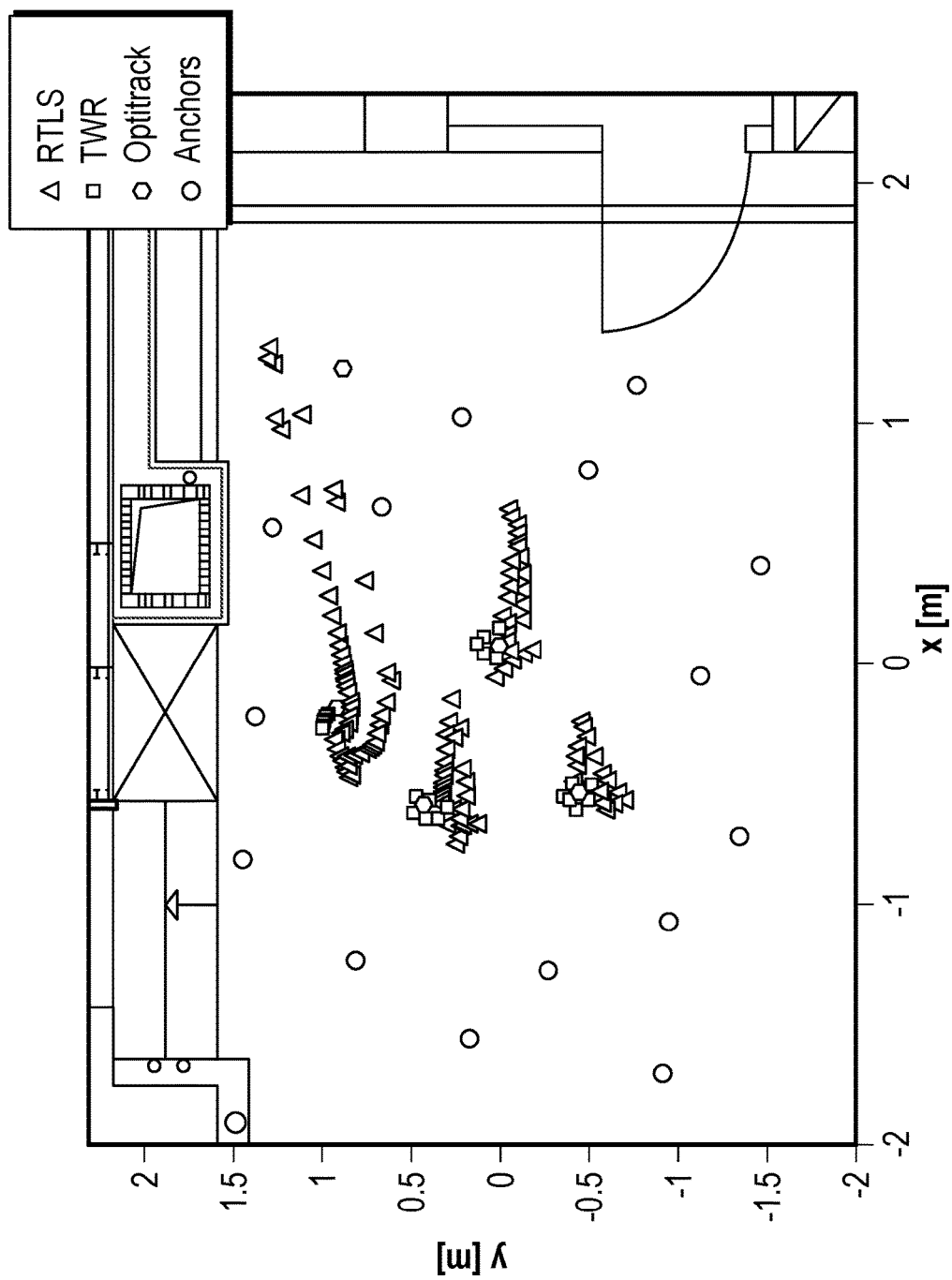

FIGS. 8A-8D illustrate the results for a static location/orientation determination scenario in the small room, according to some embodiments. Specifically, FIG. 8A illustrates an obstacle-free scenario with static subjects, while FIG. 8B illustrates static subjects in the presence of another person standing next to the subjects. These figures show scatter plots of the estimated positions of four different subjects. The results plotted in the figures correspond to four experiments carried on at different times (one per position)

and plotted together. The actual four positions that we used for the tests were randomly chosen within the coverage area of the OptiTrack system so that the exact position was known with millimeter precision. FIGS. 8A-8B compare the RTLS system to the TWR system and show both the positions of the static anchors and the exact position of the subjects (measured using the OptiTrack). In the presence of one obstacle (refer again to Table 1), the RTLS provided lower accuracy due to the dispersion of the estimates.

Figure 8C:
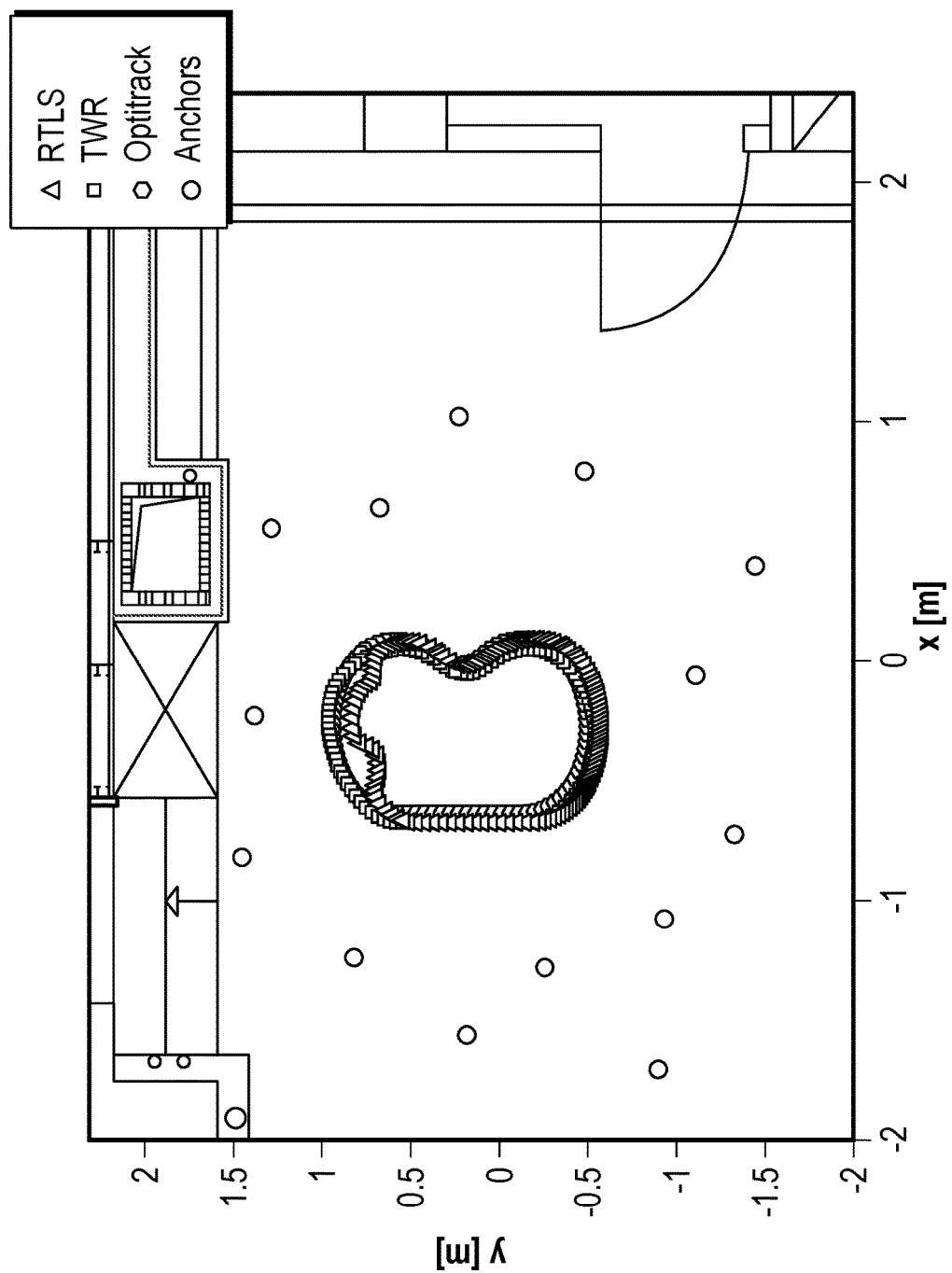
Figure 8D:
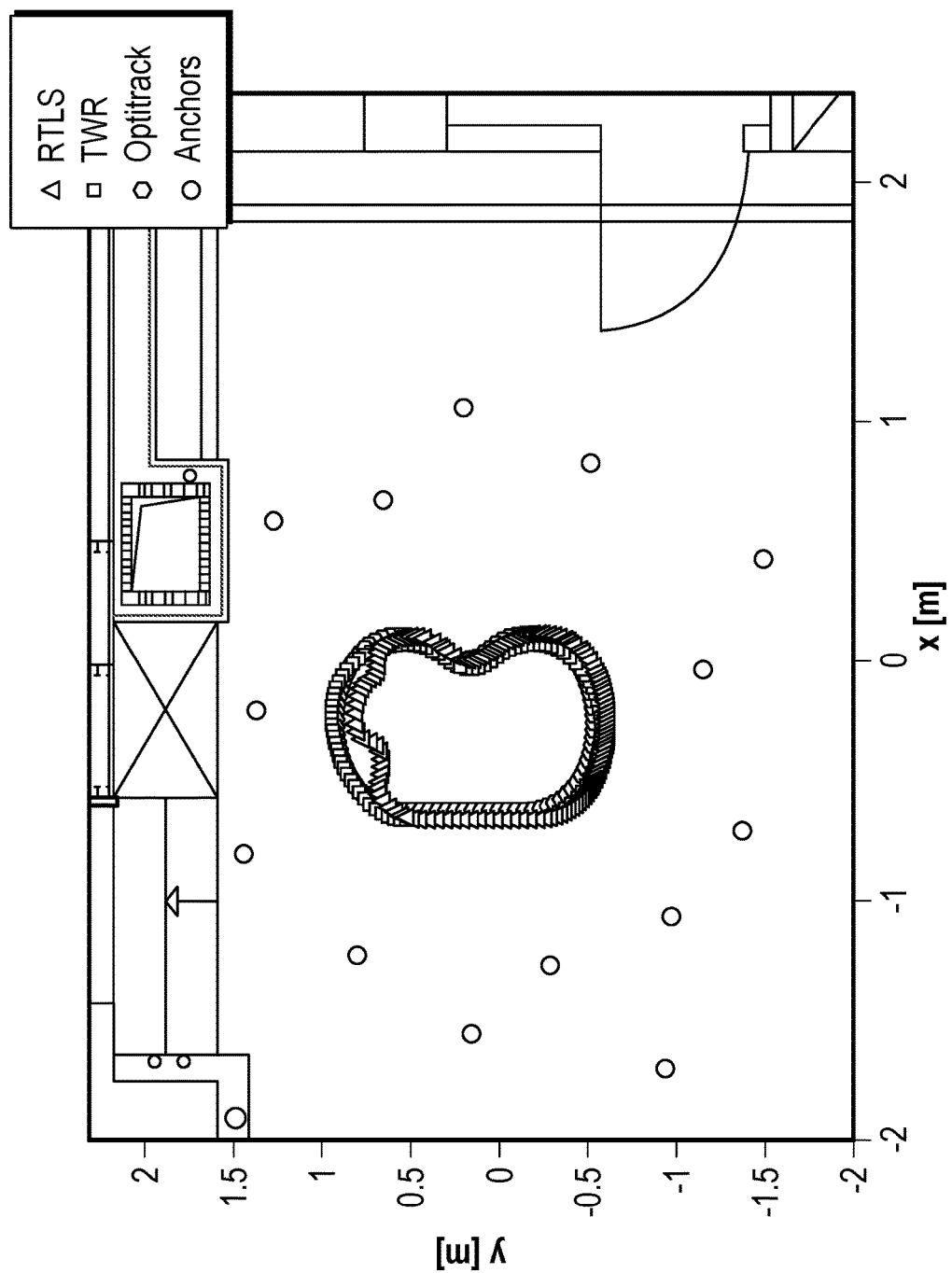

FIG. 8C illustrates an obstacle-free scenario with mobile subjects, while FIG. 8D illustrates a mobile subjects in the presence of another person standing next to the subjects. The mobile subject scenario shows similar results as were seen in the static scenario. The measurements were done using the same network of 15 static anchor nodes as in the static case. The FIGS. 8C-8D show the bean-shaped motion path of the radio-controlled train, which moves with constant speed. In absence of obstacles, the TWR system matched the OptiTrack path with 3-D average accuracy of $0.15 \pm 0.026$ whereas the average accuracy of the RTLS system is $0.17 \pm 0.050$ (refer again to Table 2). The RTLS accuracy drops on the top part of the path, most likely because of the configuration of the walls that surround the room. Specifically, FIG. 8D empirically proves that RTLS accuracy is dramatically influenced by the presence of one obstacle (in this case walking within the capture area). This observation is true for both static and mobile subjects.

FIGS. 9A-9D illustrate probability density function (pdf) estimates of the error for both RTLS and TWR scenarios with and without obstacles. These figures confirm what is visualized in FIGS. 9A-9D. FIG. 9A illustrates TWR results in the absence of any obstacles. FIG. 9B illustrates TWR results in the presence of one obstacle. Similarly, FIG. 9C illustrates RTLS results in the absence of any obstacles. FIG. 9D illustrates RTLS results in the presence of one obstacle. The data in FIGS. 9A-9D illustrates how the distribution of errors is shifted towards higher errors in the presence of an obstacle for the RTLS system. Specifically, the RTLS system suffers in the presence of obstacles, and as result has a much larger distribution of errors compared to the TWR system.

Figure 10:
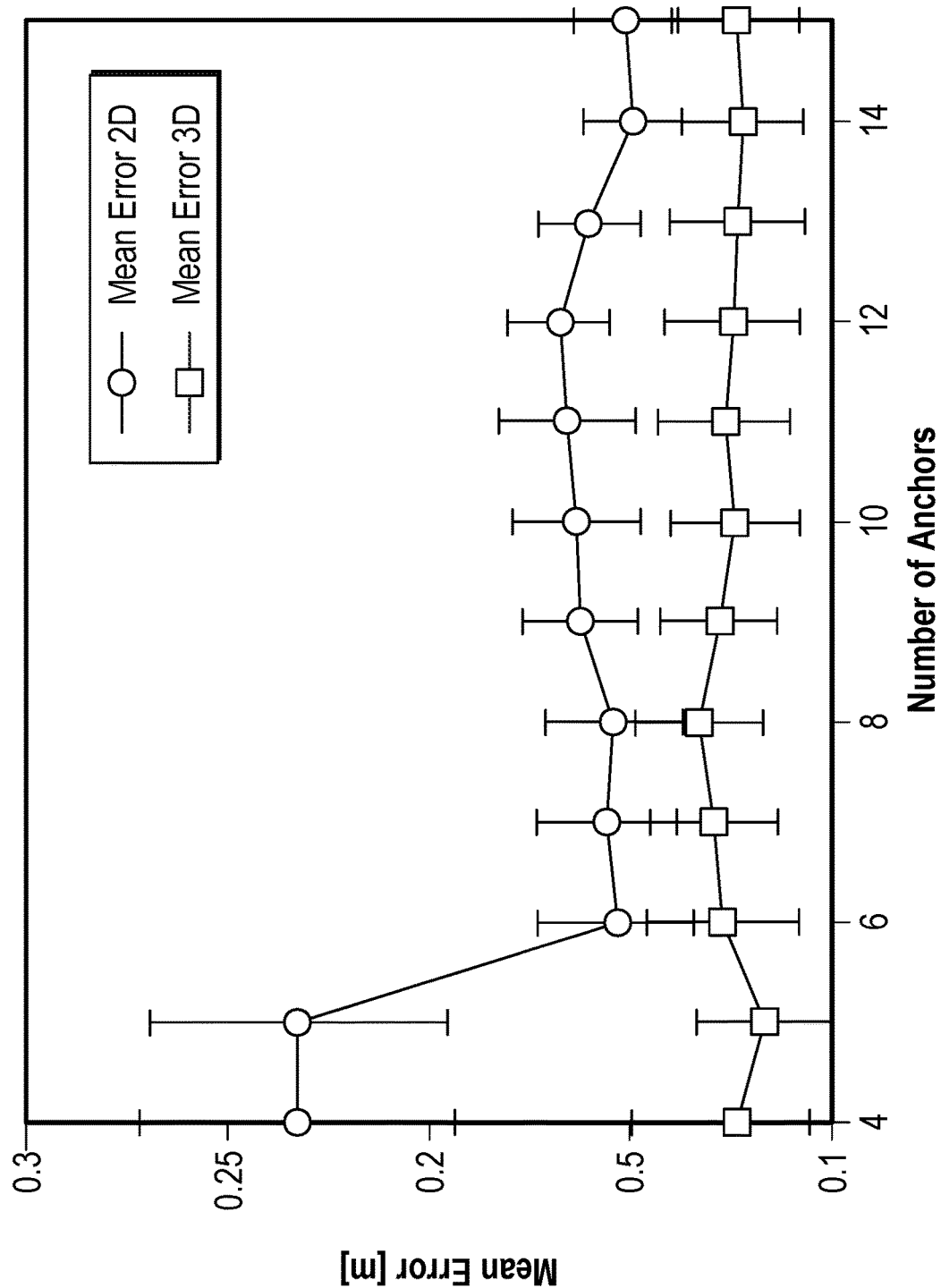
FIG. 10 illustrates a graph illustrating the impact of the number of anchors used versus the resultant accuracy, according to a test embodiment.

Another purpose of the test set up was to determine how the number of anchors affected the precision of the system. As expected, the number of static anchors used to follow a subject influences the precision of the system. FIGS. 8A-8D and FIGS. 9A-9D show measurement results for 15 anchors. FIG. 10 illustrates a graph illustrating the impact of the number of anchors used versus the resultant accuracy, according to a test embodiment. FIG. 10 specifically shows the small room scenario with one mobile subject without obstacles and the impact of the number of anchors over the accuracy. FIG. 10 also shows the standard deviation of the measurements. In this simple scenario with one subject, the 2D accuracy is independent from the number of anchors; nevertheless, 3D accuracy needs at least 6 anchors before converging to a stable value.

The measurement results plotted in FIG. 10 correspond to a scenario where the static anchors are chosen in such a way that the first four anchors are placed at maximum distance relative to each other with an anchor density of 1 anchor per $m^2$. Then, every additional anchor was chosen so that it covers the areas with less anchor density. With 15 anchors, the anchor density grows to 3.75 anchors per $m^2$.

Figure 11:
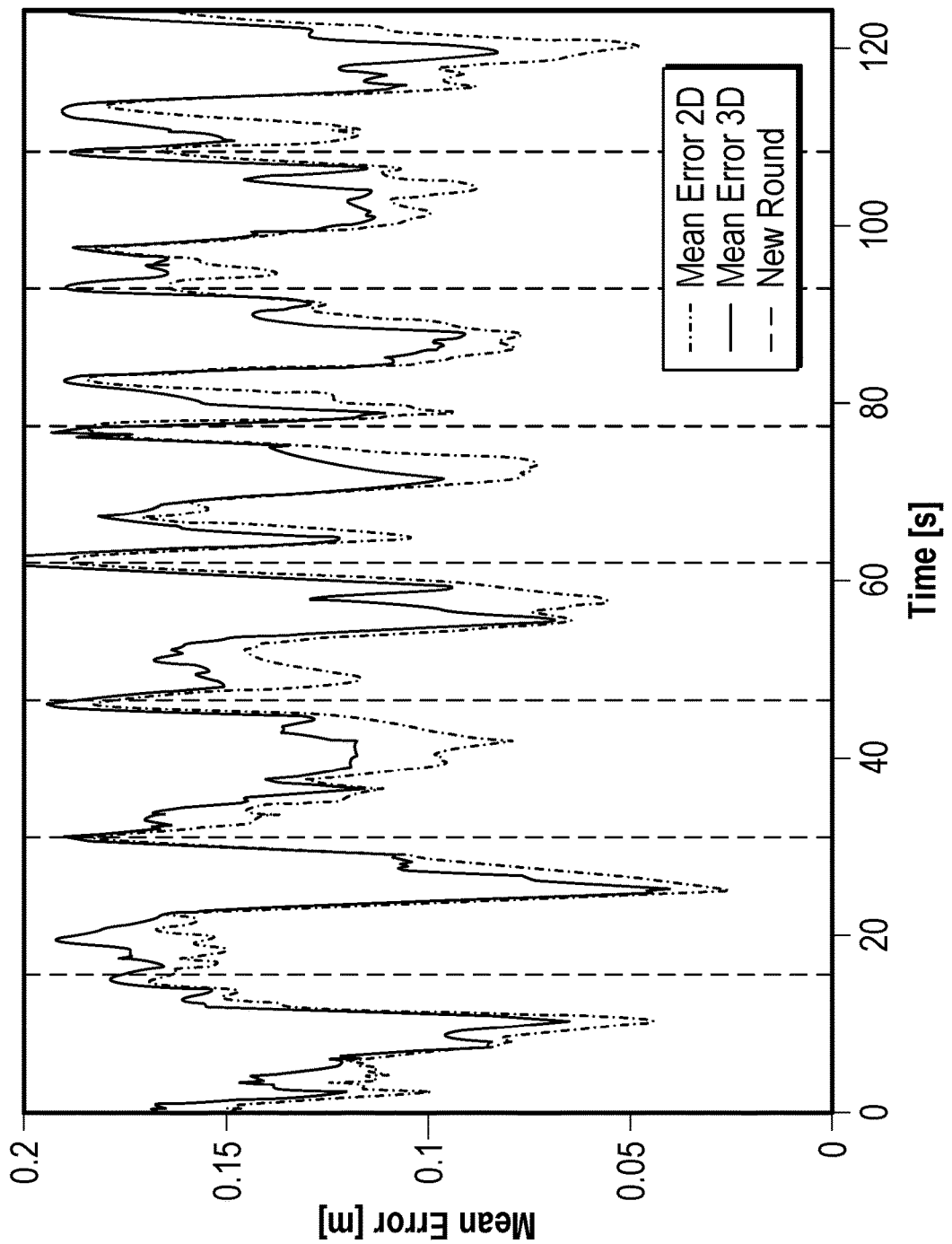
FIG. 11 illustrates a graph of the mean estimate error versus time.

The periodic motion pattern analyzed above enables accuracy observations over time. In fact, in each mobile experiment, the subject followed the same bean-shaped path eight times at constant speed. The subject moved in a counter-clockwise direction, always starting at the center of the path corresponding to the inner part of the loop. Each tour of the path took about 18 seconds. FIG. 11 illustrates a graph of the mean estimate error versus time. Specifically, FIG. 11 illustrates that while one walking person does affect the accuracy, the average error is always lower than 20 cm.

Figure 12:
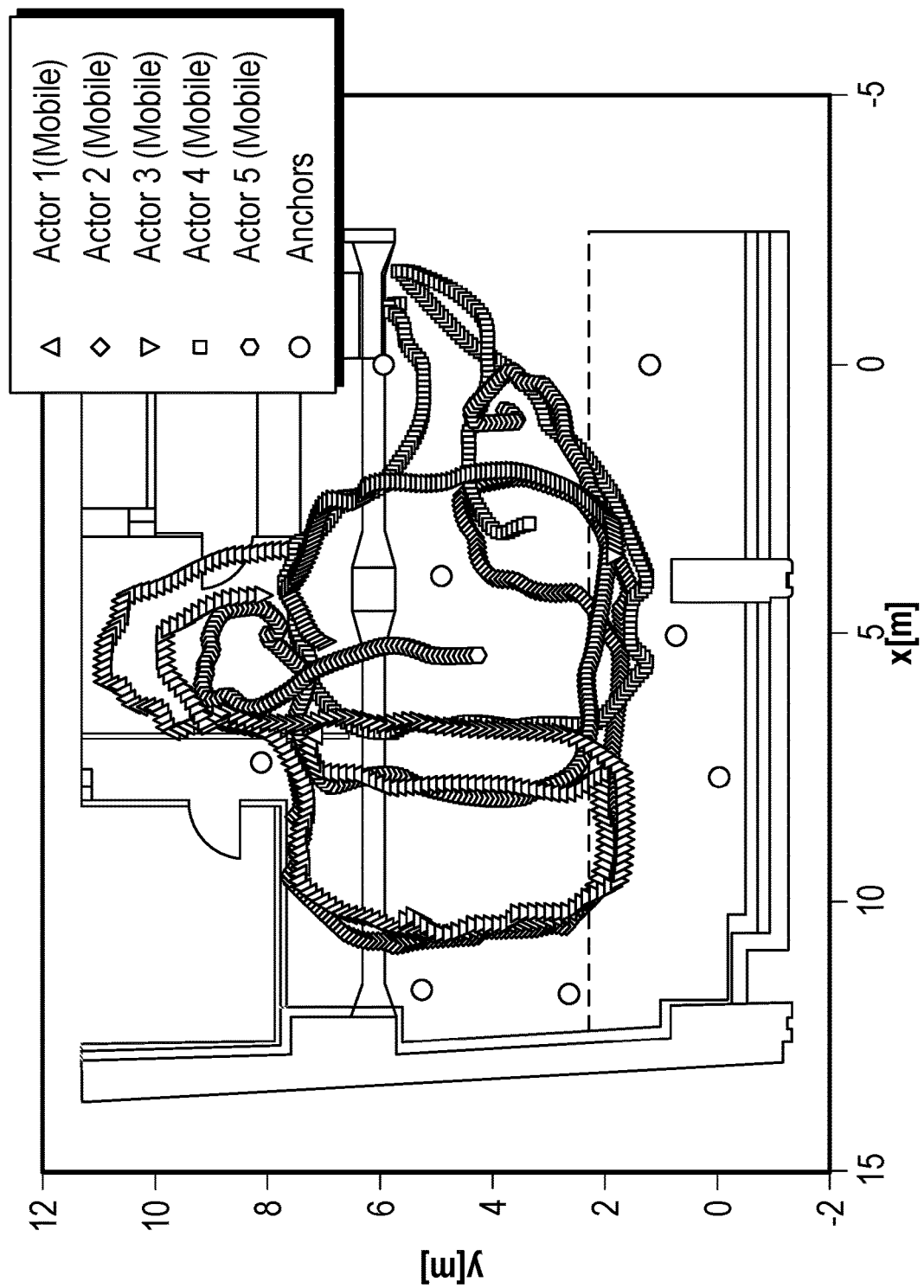
FIG. 12 illustrates results for multiple subjects being determined over time for the larger space.

The data above is primarily representative of a single subject being followed over time. FIG. 12 illustrates results for multiple subjects being followed over time for the larger space (area $13 \times 8 \ m^2$). The setup included static nine anchors deployed as shown in FIG. 12 for a total anchor density of 0.09 anchors per $m^2$. FIG. 12 shows 60 s of the path of five freely walking subjects being followed at the same time. FIG. 12 shows the scalability of the system in that the presence of five simultaneous subjects does not impact the performance.

Figure 13:
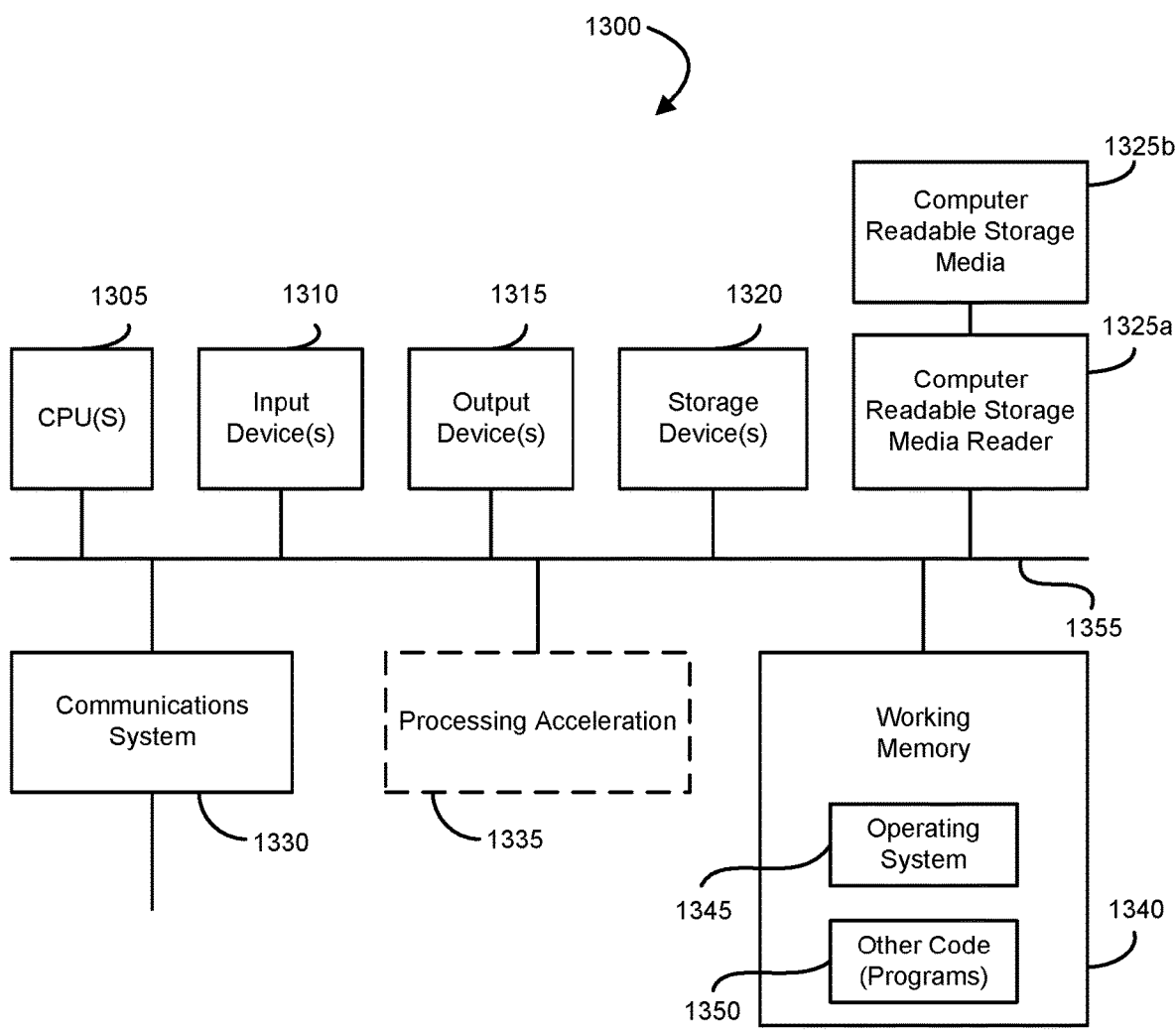
FIG. 13 illustrates an exemplary computer system, in which portions of the various embodiments of the present invention may be implemented.

As described above, the facial location and orientation determination system includes a server and/or computer system to perform the described calculations. FIG. 13 illustrates an exemplary computer system 1300, in which portions of the various embodiments of the present invention may be implemented. The system 1300 may be used to implement any of the computer systems described above. The computer system 1300 is shown comprising hardware elements that may be electrically coupled via a bus 1355. The hardware elements may include one or more central processing units (CPUs) 1305, one or more input devices 1310 (e.g., a mouse, a keyboard, etc.), and one or more output devices 1315 (e.g., a display device, a printer, etc.). The computer system 1300 may also include one or more storage device 1320. By way of example, storage device(s) 1320 may be disk drives, optical storage devices, solid-state storage device such as a random access memory ("RAM") and/or a read-only memory ("ROM"), which can be programmable, flash-updateable and/or the like.

The computer system 1300 may additionally include a computer-readable storage media reader 1325a, a communications system 1330 (e.g., a modem, a network card (wireless or wired), an infra-red communication device, etc.), and working memory 1340, which may include RAM and ROM devices as described above. In some embodiments, the computer system 1300 may also include a processing acceleration unit 1335, which can include a DSP, a special-purpose processor and/or the like.

The computer-readable storage media reader 1325a can further be connected to a computer-readable storage medium 1325b, together (and, optionally, in combination with storage device(s) 1320) comprehensively representing remote, local, fixed, and/or removable storage devices plus storage media for temporarily and/or more permanently containing computer-readable information. The communications system 1330 may permit data to be exchanged with the network 1320 and/or any other computer described above with respect to the system 1300.

The computer system 1300 may also comprise software elements, shown as being currently located within a working memory 1340, including an operating system 1345 and/or other code 1350, such as an application program (which may be a client application, web browser, mid-tier application, RDBMS, etc.). It should be appreciated that alternate embodiments of a computer system 1300 may have numerous variations from that described above. For example, customized hardware might also be used and/or particular elements might be implemented in hardware, software (including portable software, such as applets), or both. Further, connection to other computing devices such as network input/output devices may be employed. Software of computer system 1300 may include code 1350 for implementing embodiments of the present invention as described herein.

Each of the methods described herein may be implemented by a computer system, such as computer system 1300 in FIG. 13. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of determining facial location and orientation, the method comprising:
   receiving a location of a first radio frequency (RF) tag on a subject;
   receiving a location of a second RF tag on the subject;
   determining a location and orientation of a face of the subject using at least the location of the first RF tag and the location of the second RF tag; and
   sending commands to one or more camera units, wherein the commands are generated using the location and orientation of the face of the subject to cause the one or more camera units to capture images of the face of the subject.

2. The method of claim 1, wherein the first RF tag and the second RF tag comprise Ultra-Wideband (UWB) tags.

3. The method of claim 1, wherein the first RF tag is attached to a first shoulder of the subject, and wherein the second RF tag is attached to a second shoulder of the subject.

4. The method of claim 1, wherein the first RF tag is attached to a first side of a head of the subject, and wherein the second RF tag is attached to a second side of the head of the subject.

5. The method of claim 1, wherein the subject is on a film set, and the one or more cameras are capturing a scene of a film.

6. The method of claim 1, wherein the subject is in an immersive environment.

7. The method of claim 6, wherein the immersive environment comprises a virtual reality environment.

8. The method of claim 6, wherein the immersive environment comprises an augmented reality environment.

9. A system comprising:
   a first radio frequency (RF) tag on a subject;
   a second RF tag on the subject;
   one or more camera units;
   one or more processors; and
   one or more memory devices comprising instructions that, when executed by the one or more processors, cause the one or more processors to perform operations comprising:
      receiving a location of the first RF tag on the subject;
      receiving a location of the second RF tag on the subject;
      determining a location and orientation of a face of the subject using at least the location of the first RF tag and the location of the second RF tag; and
      sending commands to one or more camera units, wherein the commands are generated using the location and orientation of the face of the subject to cause the one or more camera units to capture images of the face of the subject.

10. The system of claim 9, wherein the one or more camera units comprises a camera and a pan-tilt mount.

11. The system of claim 9, wherein the commands cause the one or more camera units to capture the location and orientation of the face of the subject by changing a pan, a tilt, and a zoom of the one or more camera units.

12. The system of claim 9, further comprising one or more RF anchors that are distributed around the subject, wherein the one or more RF anchors provide time-of-arrival (ToA) measurement to determine the location of the first RF tag and the second RF tag.

13. The system of claim 9, wherein the one or more memory devices comprise additional instructions that, when executed by the one or more processors, cause the one or more processors to perform additional operations comprising:
   determining a camera unit in the one or more camera units that best captures the face of the subject for each frame.

14. The system of claim 13, wherein one or more memory devices comprise further instructions that, when executed by the one or more processors, cause the one or more processors to perform further operations comprising:
   generating a video sequence where each frame is selected from the camera unit in the one or more camera units that best captures the face of the subject for each frame.

15. A non-transitory, computer-readable medium comprising instructions that, when executed by one or more processors, cause the one or more processors to perform operations comprising:
   receiving a location of the first RF tag on the subject;
   receiving a location of the second RF tag on the subject;

determining a location and orientation of a face of the subject using at least the location of the first RF tag and the location of the second RF tag; and sending commands to one or more camera units, wherein the commands are generated using the location and orientation of the face of the subject to cause the one or more camera units to capture images of the face of the subject.

16. The non-transitory, computer-readable medium of claim 15, wherein determining the location and the orientation of the face of the subject using at least the location of the first RF tag and the location of the second RF tag comprises:

removing noise from a time series of RF tag measurements by averaging the time series over time.

17. The non-transitory, computer-readable medium of claim 15, wherein determining the location and the orientation of the face of the subject using at least the location of the first RF tag and the location of the second RF tag comprises:

filtering a series of measurements of the location of the first RF tag to remove position outliers.

18. The non-transitory, computer-readable medium of claim 15, wherein determining the location and the orientation of the face of the subject using at least the location of the first RF tag and the location of the second RF tag comprises:

compensating for obstacles by computing a ratio between a total path strength and a first path strength for each of a plurality of RF measurements.

19. The non-transitory, computer-readable medium of claim 15, wherein determining the location and the orientation of the face of the subject using at least the location of the first RF tag and the location of the second RF tag comprises:

solving a mulilateration formulation using a least-squares approach.

20. The non-transitory, computer-readable medium of claim 15, wherein determining the location and the orientation of the face of the subject using at least the location of the first RF tag and the location of the second RF tag comprises:

computing a pose of the face of the subject in terms of yaw, pitch, and roll.

* * * * *